Figure 1:
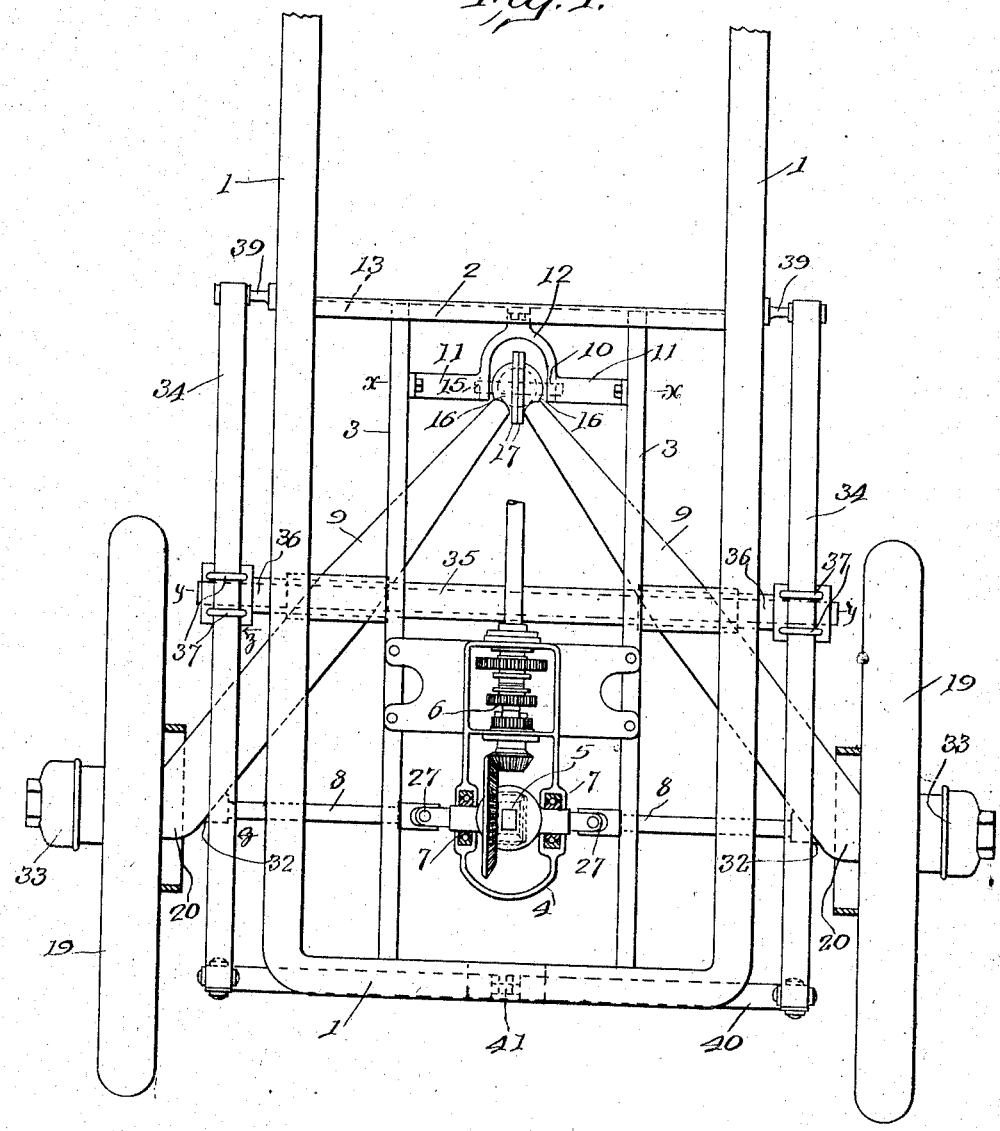

E. KOEB & R. P. THOMPSON.
AUTOMOBILE.
APPLICATION FILED JUNE 21, 1909.

995,155.

Patented June 13, 1911.

3 SHEETS—SHEET 1.

Witnesses
G. Howard Walmsley.
Edward L. Reed

Inventors
Emil Koeb,
Ralph P. Thompson
By H. A. Toulmin,
Attorney

E. KOEB & R. P. THOMPSON.
AUTOMOBILE.
APPLICATION FILED JUNE 21, 1909.
995,155.
Patented June 13, 1911.
3 SHEETS—SHEET 2.
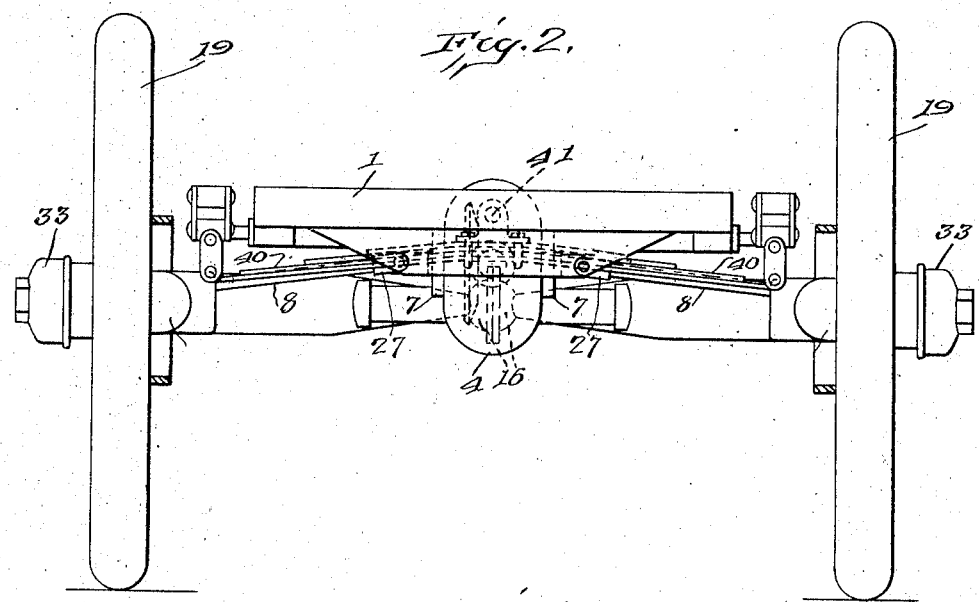
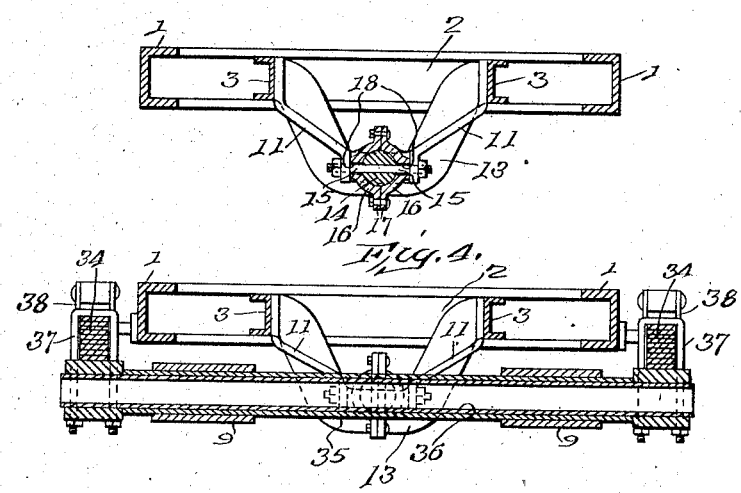
Witnesses
G. Howard Walmsley.
Edward L. Reed.
Inventors
Emil Koeb,
Ralph P. Thompson,
By H. A. Goodwin,
Attorney

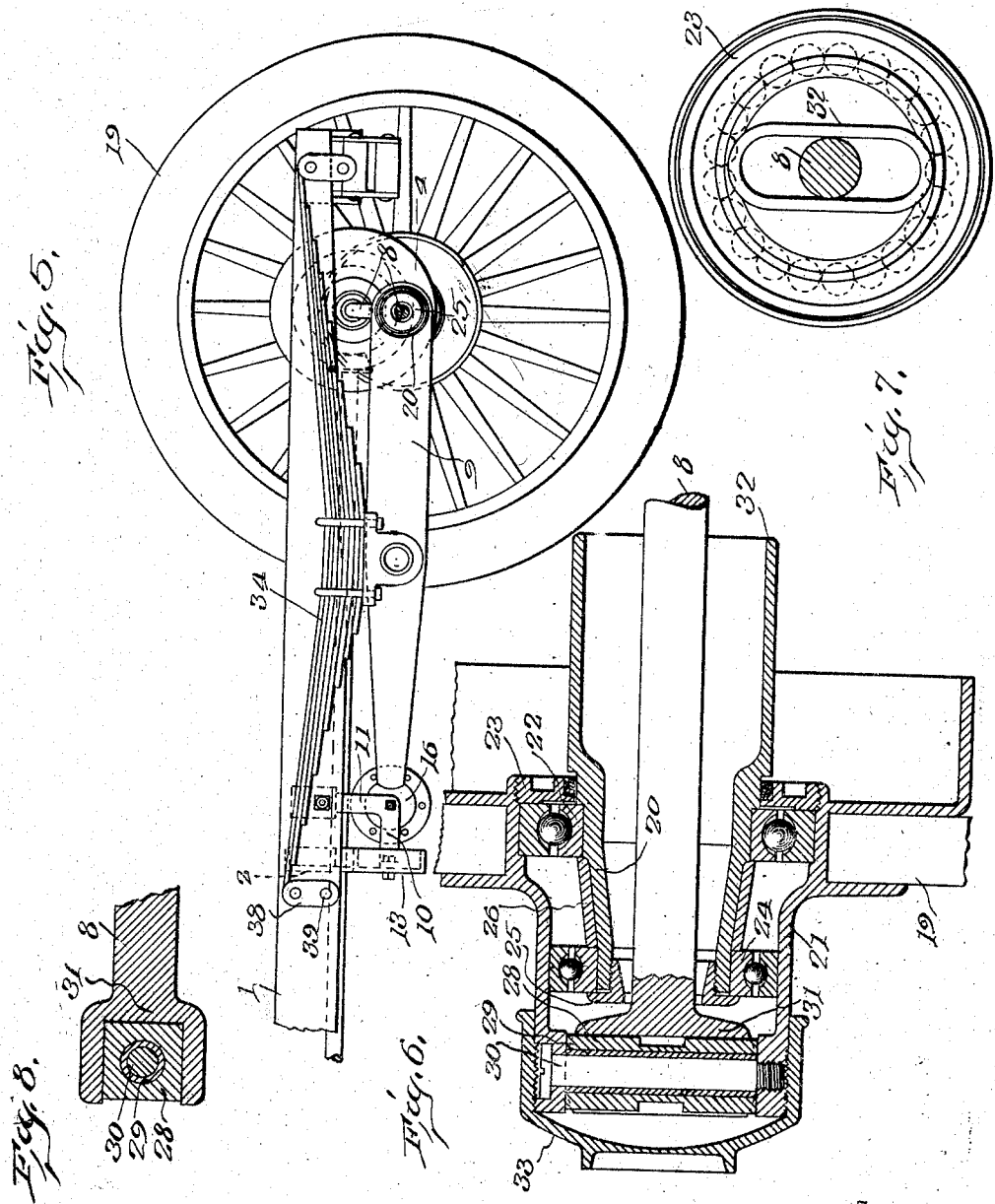

UNITED STATES PATENT OFFICE.

EMIL KOEB, OF LEIPSIC, AND RALPH P. THOMPSON, OF SPRINGFIELD, OHIO.

AUTOMOBILE.

995,155. Specification of Letters Patent. Patented June 13, 1911.

Application filed June 21, 1909. Serial No. 503,349.

*To all whom it may concern:*

Be it known that we, EMIL KOEB and RALPH P. THOMPSON, citizens of the United States, residing at Leipsic, Putnam county, Ohio, and Springfield, in the county of Clark and State of Ohio, have invented certain new and useful Improvements in Automobiles, of which the following is a specification, reference being had therein to the accompanying drawings.

Our invention relates to automobiles, and more particularly to the spring-supporting mechanism by means of which the body portion of the machine is secured to the running gear, and is in the nature of an improvement upon the machine shown and described in Patent No. 842,591, granted to us Jan'y 27, 1907.

The object of the invention is to provide a supporting mechanism of this character arranged and constructed in such a manner as to permit the drive wheels to move vertically relatively to the body portion and to permit one of the drive wheels to move vertically relatively to the body portion without materially altering the position of the other drive wheel, thereby enabling the drive wheels to accommodate themselves to irregularities of the roadway without transmitting any substantial shock or jar to the body portion of the automobile, and rendering the automobile more easy riding.

To this and other ends our invention consists in certain novel features and in certain combinations and arrangements of parts hereinafter to be described, and then more particularly pointed out in the claims.

In the accompanying drawings, Figure 1 is a top plan view of the rear portion of an automobile embodying our invention with the body portion removed; Fig. 2 is a rear end elevation of such an automobile; Fig. 3 is a transverse sectional view on the line *x x* of Fig. 1; Fig. 4 is a transverse sectional view taken on the line *y y* of Fig. 1; Fig. 5 is a side elevation of the rear portion of the automobile with the drive wheel removed; Fig. 6 is a longitudinal sectional view taken centrally through the hub of one of the drive wheels and its spindle; Fig. 7 is a view showing the inner side of one of the hubs in elevation, and Fig. 8 is a detail sectional view of the universal joint connecting the driving shaft to the hub of the drive wheel.

In these drawings we have illustrated one form of our invention and have shown the same as embodied in an automobile comprising a main frame 1, which main frame supports the body portion of the automobile and is here treated as forming a part of that body portion. It will be understood, of course, that this body portion may be of any suitable character, depending upon the type of automobile to which the invention is applied, but inasmuch as the body portion *per* *se* does not enter into the present invention we have shown only the rear portion of the main frame, which, as above stated, forms a part of the body portion. The main frame 1 is of usual construction, being substantially rectangular in shape and is provided with a transverse member 2 at a point between the front and rear ends thereof. A secondary frame 3 is mounted upon the main frame and consists of two longitudinal members extending between the transverse member 2 and the rear transverse member of the main frame and arranged between and substantially parallel with the side members of the main frame. The gear casing 4 is supported from the secondary frame 3 and contains the compensating gear 5 and transmission gearing 6 which may be of any suitable construction. The casing 4 is provided in its opposite sides with bearings 7 in which is journaled the driving shaft 8.

A supplemental or supporting frame is mounted beneath the rear portion of the main frame 1 and has its forward end pivotally connected to the main frame and has the rear ground wheels or drive wheels connected thereto near the rear end thereof. This supplemental frame may be of any suitable character, but we have here shown the same as comprising two side members or legs 9 converging forwardly, rigidly secured together at their forward ends and having their forward ends pivotally connected to the main frame by a ball and socket joint. This connection is made, in the present instance, by providing a supporting bracket 10 consisting of upwardly extending arms 11, which are secured to the side members of the supplemental frame 3, and a forwardly extending yoke 12 which is rigidly secured to a transverse member 13 arranged beneath the main frame 1 and rigidly secured to the side members thereof. A ball 14 is arranged between the two side members 11 of the bracket 10 and is provided with trunnions 15 extending from the opposite sides thereof and adapted to extend through the side members 11 of the bracket 10 and rigidly secure the ball to this bracket. These trunnions may either be formed integral with the ball or may be in the form of a bolt extending through the ball and through the side members 11 of the bracket. The forward end of the supplemental frame has a socket adapted to receive the ball 14 and complete the ball and socket joint. This socket, in the present instance, is formed by providing the forward end of each leg 9 of the supplemental frame with a substantially semi-spherical socket 16. Each of the sockets 16 is provided with a flange 17 by means of which the two semi-spherical sockets may be rigidly secured one to the other to form the spherical socket within which the ball 14 is mounted. Each of the semi-spherical sockets 16 is provided at a point adjacent to the corresponding side member 11 of the bracket with an opening 18, through which the trunnions 15 pass and which is preferably in the form of a vertically arranged slot. Thus, it will be seen that the supplemental frame is free to move both about a horizontal axis arranged transversely to the main frame, and, to a limited extent, about a horizontal axis extending longitudinally of the main frame, the movement about the longitudinal axis being limited by the length of the slots 18.

The rear ground wheels or drive wheels, which are shown at 19, are connected to the supplemental frame near the rear end thereof, and, as the same are rotated to propel the machine, they exert a forward thrust upon the main frame through the ball and socket joint by means of which the supplemental frame is connected to the main frame. In the present instance the rear ends of the two legs of the supplemental frame are provided with spindles 20, preferably by turning the rear ends of these legs outwardly, and the ground wheels are journaled directly upon these spindles. Thus the supplemental frame forms what is in effect a V-shaped axle pivotally connected at one end to the main frame and having ground wheels mounted on the outer or rear ends thereof. The two members of the supplemental frame are preferably hollow and substantially circular in cross section, and, consequently, the spindles formed at the rear end thereof, are hollow, as shown more particularly in Figs. 6 and 7. The ground wheels 19 may be mounted upon these spindles in any suitable manner. In the present instance we have shown each ground wheel as provided with a hub 21 which extends about the hollow spindle 20 of the corresponding leg of the supplemental frame. Antifriction bearings may be mounted between the spindle 20 and the hub 21, and, in the present instance, these antifriction bearings are shown as comprising two roller bearings, one of which, the larger, as shown at 22, is arranged between the hub and the spindle in substantial alinement with the spokes of the ground wheel and is held against inward movement by means of a collar 23 which is screw-threaded into the inner end of the hub. A second and smaller bearing 24 is mounted between the spindle and the hub at a point near the outer end of the spindle. The ball race, comprising the inner portion of the bearing 24, is held against outward movement by a flanged collar 25 which is screw-threaded into the outer end of the hollow spindle 20, and the two bearings 22 and 24 are spaced apart by means of a collar or sleeve 26 which is arranged between them. The ball race forming the outer portion of the bearing 24 is loosely mounted within the hub, thereby forming a floating bearing and enabling the spindle and hub to adjust themselves to maintain the proper alinement. While we have here shown one manner of mounting the wheel upon the spindle, which we have found to be satisfactory, it will be obvious that the wheels may be mounted upon the spindles in any suitable manner.

The drive shaft 8, which extends through the sides of the gear casing 4, is flexible, being provided on opposite sides of the compensating gearing 5 and on the outside of the casing 4 with universal joints 27. The outer ends of the drive shaft 8 are connected directly to the drive wheels and are provided at points near the drive wheels with universal joints. In the present instance the ends of the drive shaft are connected to the ground wheels within the hubs of those wheels and this connection is preferably made by means of a universal joint. While this joint may be of any suitable construction we have, in the present instance, provided the outer end of each hub 21 with a bearing block 28 which is journaled upon a sleeve 29, which, in turn, is rigidly secured within the outer end of the hub and in a position extending transversely thereto by means of a bolt 30. The bearing block 28 is of such a length that, when the sleeve 29 has been secured firmly in position within the hub, the bearing block will be free to rotate thereon. Each outer end of the drive shaft extends through the respective spindle 20 and has its outer end bifurcated, as shown at 31, the two arms of the bifurcation being arranged on opposite sides of the bearing block 28 and being of a width substantially equal to the length of the bearing block. The opposite edges of the two arms of the bifurcated portion of the shaft are rounded, as shown. Consequently, the shaft is free to move about an axis extending transversely to the length of the bearing block 28 and about an axis extending longitudinally to that bearing block and is also free to move longitudinally of the hub. The inner end of the spindle is provided with an elongated opening arranged vertically thereof and surrounded by a boss 32 which surrounds the shaft 8 and permits the same a certain amount of vertical movement. The outer end of the hub 21 is here shown as closed by means of a cap 33. This construction of the shaft and the manner of its connection with the ground wheels enables the ground wheels to move vertically relatively to the compensating gearing which is supported from the main frame, and this vertical movement may be either in unison or one wheel may move independently of the other without materially affecting the position of the other, it being apparent that the movement of one of the ground wheels would elevate one side of the supplemental frame and that this elevation would, to a slight extent, affect the position of the other ground wheel, but this other ground wheel would not be moved vertically and the change in its position would be so slight as to be almost imperceptible.

Suitable springs are interposed between the supplemental frame and the main frame or body portion of the machine on opposite sides of the pivotal center of the supplemental frame. These springs are pivotally connected to said supplemental frame and connected one to the other in such a manner as to cause them to move in unison about their pivotal connection to said supplemental frame and support the body portion in an upright position. As here shown these springs comprise leaf springs 34 arranged on opposite sides of the main frame and extending longitudinally thereto. These springs are connected at their opposite ends to the main frame 1 and are pivotally mounted at a point between their ends upon the supplemental frame. This pivotal connection may be made in any suitable manner, but we prefer to rigidly secure the two springs to the opposite ends of a shaft which is journaled on the supplemental frame and extends beyond the opposite sides thereof. To this end we have mounted in the supplemental frame a tube or sleeve 35 which extends through both legs of said frame and is rigidly secured to those legs and forms a rigid brace for the supplemental frame. Rotatably mounted within the tube 35 is a shaft 36, here shown as a tube which extends beyond the opposite ends of the tube 35 and has the springs 34 rigidly secured to the opposite ends thereof by means of clips 37. The forward ends of the springs are connected to the main frame by means of the usual links 38, which are connected to outwardly extending pins 39 carried by the side members of said main frame. The rear ends of the springs 34 may be secured to the main frame in any suitable manner, but we prefer to connect the rear ends of these springs to the opposite ends of a transverse member, such as a leaf spring 40 which is arranged near the rear end of the main frame 1 and is pivotally connected thereto, as shown at 41.

From the foregoing description it will be apparent that the rear ground wheels are free to accommodate themselves to the irregularities of the road; that the manner of connecting these wheels to the main frame is such that the main frame or body portion will be supported in a normally horizontal position; that any vertical movement imparted either to one or to both of the drive wheels will be absorbed by the springs and but a minimum amount of shock or jar transmitted to the body portion of the machine; that the pivotal connection between the springs and the supplemental frame enables the springs to accommodate themselves to the altered position of the supplemental frame relatively to the main frame when the ground wheels move vertically; and that, owing to the rigid connection between these springs, they are caused to move about their pivotal centers in unison, thereby maintaining the main frame or body portion in a substantially horizontal position.

From the foregoing two conclusions will be observed. The first is that we have provided a supplemental or truck frame having the characteristic of a swiveled connection with the main or body frame and carrying the ground or driving wheels at one end, the springs being supported by a movable connection with such supplemental or truck frame, though rigidly interconnected the one spring with the other, such springs being, in turn, attached to the main or body frame. The result of this organization is to produce in practice the very minimum of main frame vibration and to so distribute the wheel vibrations that where both or either wheel vibrates, the result is minimized and also distributed in a manner to prevent tilting of either side of the frame. The second conclusion is that in connection with the foregoing, we have provided what may be called a flexible transmission mechanism, that is to say, the transmission mechanism carried by the main or body frame and flexibly connected with each of the driving wheels so that their vibrations are not transmitted to the driving mechanism proper, in addition to the freedom of the main driving mechanism from vibration, due to other causes, by reason of being carried by a main frame so supported. These are important practical effects and we wish to be understood as broadly laying claim to the organization above stated.

We wish it to be understood that we do not desire to be limited to the details of construction shown and described, for obvious modifications will occur to a person skilled in the art.

Having thus fully described our invention, what we claim as new and desire to secure by Letters Patent, is:—

1. In an automobile, the combination, with a main frame, a supplemental frame pivotally connected at one end to said main frame so that its other end may move vertically, and ground wheels connected with said supplemental frame near the free end thereof, of springs interposed between said main frame and said supplemental frame, connected to said main frame, pivotally connected to said supplemental frame at a point between the axial line of the ground wheels and the point of support of said supplemental frame upon said main frame and adapted to receive the vertical movement of the ground wheels in a lesser degree, and means for interconnecting said springs to cause them to move in unison.

2. In an automobile, the combination, with a main frame, a supplemental frame located beneath the rear portion of said main frame and pivotally connected thereto at its forward end so that its rear end may move vertically, and ground wheels connected to said supplemental frame near the rear end thereof, of springs interposed between said main frame and said supplemental frame, connected at their opposite ends to said main frame, pivotally mounted on said supplemental frame at points between their ends and rigidly connected one to the other.

3. In an automobile, the combination, with a main frame, a supplemental frame located beneath the rear portion of said main frame and pivotally connected thereto at its forward end so that its rear end may move vertically, and ground wheels connected to said supplemental frame near the rear end thereof, of a transverse shaft pivotally mounted on said supplemental frame and extending beyond the sides thereof, and springs rigidly secured to the opposite ends of said shaft and connected to said main frame.

4. In an automobile, the combination, with a main frame, a supplemental frame located beneath the rear portion of said main frame and pivotally connected thereto at its forward end so that its rear end may move vertically, and ground wheels connected to said supplemental frame near the rear end thereof, of a shaft journaled on said supplemental frame and extending beyond the opposite sides thereof, and springs extending longitudinally of said main frame, and connected at their opposite ends to said main frame and rigidly connected between their ends to the opposite ends of said shaft.

5. In an automobile, the combination, with a main frame, a supplemental frame located beneath the rear portion of said main frame and pivotally connected thereto at its forward end so that its rear end may move vertically, and ground wheels connected to said supplemental frame near the rear end thereof, of a member extending transversely to said main frame and pivotally connected thereto near the rear end thereof, a shaft journaled on said supplemental frame, springs extending longitudinally of said main frame, each of said springs being rigidly secured to one end of said shaft, having one end connected to the adjacent end of said transverse member and its other end connected to said main frame.

6. In an automobile, the combination, with a main frame, a supplemental frame located beneath the rear portion of said main frame and pivotally connected thereto at its forward end so that its rear end may move vertically, and ground wheels connected to said supplemental frame near the rear end thereof, of a spring extending transversely to said main frame and pivotally connected thereto near the rear end thereof, a shaft journaled in said supplemental frame and extending beyond the sides thereof, a spring extending longitudinally of said main frame on each side thereof, such spring being rigidly mounted on one end of said shaft at a point between its ends, having one end connected to the corresponding end of said transverse spring and its other end connected to said main frame.

7. In an automobile, the combination, with a main frame, a supplemental frame comprising forwardly converging side members pivotally connected at their forward ends to said main frame, spindles arranged at the rear ends of the side members of said supplemental frame, ground wheels mounted on said spindles, and a driving shaft directly connected to said ground wheels, of a shaft journaled in the side members of said supplemental frame at a point intermediate their ends, and springs rigidly secured to said shaft at points intermediate their ends and connected at their ends to said main frame.

8. In an automobile, the combination, with a main frame, a supplemental frame comprising forwardly converging side members pivotally connected at their forward ends to said main frame, spindles arranged at the rear ends of the side members of said supplemental frame, ground wheels mounted on said spindles, and a driving shaft directly connected to said ground wheels, of a tube rigidly secured to each of the side members of said supplemental frame, a shaft journaled in said tube and extending beyond the ends thereof, a spring rigidly secured to each end of said shaft and connected at its opposite ends to said main frame.

9. In an automobile, the combination with a main frame, a supplemental frame comprising forwardly converging side members pivotally connected at their forward ends to said main frame, spindles arranged at the rear ends of the side members of said supplemental frame, ground wheels mounted on said spindles, and a driving shaft directly connected to said ground wheels, of a rigid connection between the side members of said supplemental frame, a shaft journaled on said side members and extending beyond the sides thereof, a spring arranged transversely to said main frame and pivotally connected thereto near the rear end thereof, springs arranged longitudinally of said main frame, rigidly secured to the opposite ends of said shaft, connected at their forward ends to said main frame and connected at their rear ends to the adjacent ends of said transverse spring.

10. In an automobile, the combination, with a main frame, of a supplemental frame comprising two forwardly converging members each having a substantially semispherical socket at its forward end, a spherical bearing rigidly secured to said main frame and adapted to enter said socket, means for rigidly connecting together the forward ends of said supplemental frame members, and ground wheels connected to the rear ends of said supplemental frame members.

11. In an automobile, the combination, with a main frame, a bracket rigidly secured to said main frame and comprising two side members, a bearing ball arranged between said side members, and trunnions rigidly secured to said ball and connected to the side members of said bracket, of a supplemental frame comprising forwardly converging side members, each of said side members having a substantially semispherical socket at the forward end thereof adapted to fit over said bearing ball and having openings therein for the passage of said trunnions, means for rigidly securing the forward ends of said supplemental frame members one to the other, and drive wheels connected to the rear ends of said supplemental frame members.

12. In an automobile, the combination, with a main frame, a supplemental frame, comprising forwardly converging side members, arranged beneath the rear portion of the main frame and pivotally connected at its forward end to said main frame, and ground wheels connected to the rear ends of the converging side members of said supplemental frame, of a driving shaft supported from said main frame and having its outer ends connected within the hubs of said ground wheels, said shaft having a universal joint on each side of the point of support from said main frame and having a universal joint at its point of connection to said hubs.

13. In an automobile, the combination, with a main frame, a supplemental frame pivotally connected at its forward end to said main frame, hollow spindles carried by the rear end of said supplemental frame, ground wheels having hubs journaled on said spindles and extending beyond the outer ends thereof, and springs interposed between said main frame and said supplemental frame, said springs being pivotally mounted on said supplemental frame and rigidly connected one to the other, of a driving shaft supported from said main frame, having a universal joint on each side of the point of support and having its opposite ends extending through said hollow spindles, and a universal joint connecting each end of said shaft to the respective hub.

14. In an automobile, a main or body frame, springs connected thereto, a supplemental or truck frame having one end swiveled to said main or body frame, ground wheels carrying the other end thereof, and a transverse bar journaled to said supplemental frame and connecting said springs.

15. In an automobile, a main or body frame, transmission mechanism supported thereby, a flexible connection between it and ground wheels, supporting springs connected to said frame, a supplemental or truck frame having one end swiveled to said main or body frame, ground wheels carrying the other end thereof and connected with the transmission mechanism through the flexible connection aforesaid, and a transverse bar journaled to the supplemental or truck frame and having said springs connected thereto.

16. In an automobile, a main frame, an axle, ground wheels supporting said axle, said axle being pivotally attached to the main frame at a point forward of the axial line of the ground wheels and having a swiveled movement around an axis in the line of travel of the vehicle, springs interposed between said main frame and said axle, said springs being rigidly attached to each other by a cross member to cause them to act in unison to support the body portion in upright position and being pivotally connected to the axle at or near the point of connection with said cross member for the purpose of securing a free movement of the springs independently of the swiveling or the rising and falling of the axle.

17. In an automobile, a main frame, an axle, ground wheels supporting said axle, said axle being pivotally attached to the main frame at a point forward of the axial line of the ground wheels and having a swiveled movement upon an axis in the line of travel of the vehicle, springs interposed between said main frame and said axle, a cross member rigidly attaching said springs one to the other to cause the same to act in unison to support the body portion in an upright position, said springs being pivotally connected to the axle at or near the point of connection with said cross member for the purpose of securing the free movement of the springs independent of the swiveling and rising and falling of the axle, and a flexible drive shaft connected with each ground wheel and with driving mechanism mounted upon the main frame.

18. In an automobile, the main frame, an axle, ground wheels supporting said axle, said axle being pivotally connected to the main frame at a point forward of the axial line of the ground wheels and having a swiveled movement about an axis in the line of travel of the vehicle, springs interposed between said main frame and said axle, said springs being pivotally mounted on said axle and rigidly connected one to the other, and a flexible drive shaft connected to each of said ground wheels and to a driving mechanism mounted upon the main frame.

19. In an automobile, the combination, with a main frame, a supplemental frame located beneath said main frame and pivotally connected thereto at one end so that its other end may move vertically, and ground wheels connected with said supplemental frame near the free end thereof, of springs interposed between said main frame and said supplemental frame, connected to said main frame, pivotally connected to said supplemental frame at a point between the axial line of the ground wheels and the point of support of said supplemental frame upon said main frame, rigidly connected one to the other and adapted to receive the vertical movement of the ground wheels in a lesser degree.

In testimony whereof, we affix our signatures in presence of two witnesses.

EMIL KOEB.
RALPH P. THOMPSON.

Witnesses:
ELZA F. McKEE,
EDWARD L. REED.